Figures 1, 2:
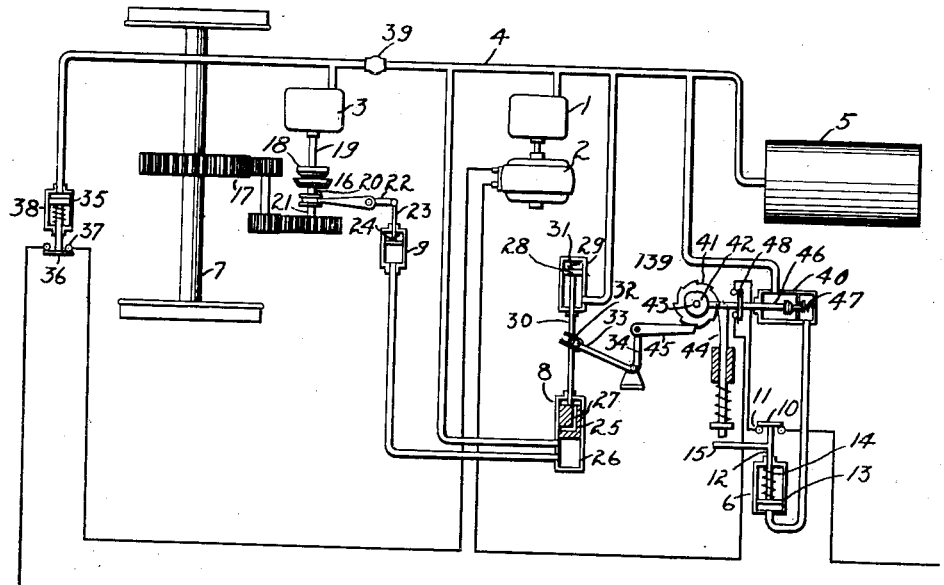

K. A. SIMMON.
COMPRESSOR SYSTEM.
APPLICATION FILED SEPT. 28, 1917.

1,376,467.

Patented May 3, 1921.

WITNESSES:
T. R. Krear
W. B. Wells

INVENTOR
Karl A Simmon
BY
Wesley G. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

COMPRESSOR SYSTEM.

1,376,467.   Specification of Letters Patent.   Patented May 3, 1921.

Application filed September 28, 1917. Serial No. 193,686.

*To all whom it may concern:*

Be it known that I, KARL A. SIMMON, a citizen of the United States, and a resident of Edgewood Park, in the county of Allegheny and State of Pennsylvania, have invented a new and useful Improvement in Compressor Systems, of which the following is a specification.

My invention relates to compressor systems and particularly to compressor systems for fluid-braking systems for service on electric vehicles.

One object of my invention is to provide a compressor system for a braking system that shall be simple and economical in construction and insure fluid pressure for braking purposes when the vehicle is operating under normal and under emergency conditions.

Another object of my invention is to provide a compressor system of the above-indicated character that shall be provided with a main fluid compressor and an emergency fluid compressor for service under normal operating conditions of the system, means for operating the emergency compressor of the system under abnormal conditions, and means for insuring the operation of the compressors in a predetermined sequence when the system is operating under normal conditions.

More specifically, my invention embodies a compressor system provided with a motor-driven fluid compressor for service under normal conditions and an emergency fluid compressor driven by the momentum of the vehicle for service in case of abnormally low fluid pressure in the system. Under normal operating conditions, the pressure in the system is maintained by the main compressor, but in order to insure that the emergency compressor is available for service, the same is operated with the main compressor in a given sequence. Moreover, means is provided for preventing the simultaneous operation of the two compressors under all conditions of operation.

It is essential, in many cases, to provide an emergency means for maintaining the fluid pressure in the compressor system of an electric vehicle, inasmuch as the main compressor may be unavailable for service by reason of failure of the supply circuit or a defect in the main compressor or in the operating motor therefor. Thus, in case the vehicle is descending a grade, and there is a failure of power, the vehicle would be without means for maintaining fluid pressure in the system unless an emergency compressor is provided.

In a system constructed in accordance with my invention, a motor-driven fluid compressor and a fluid compressor driven by the momentum of the vehicle are operated in a predetermined sequence to maintain the fluid pressure in the braking system under abnormal operating conditions of the system, and in case the fluid pressure of the system is reduced below a predetermined value by failure of the motor driven compressor for any reason, the emergency compressor is operated to maintain the fluid pressure above a predetermined value.

In the accompanying drawing, Figure 1 is a diagrammatic view of a system constructed in accordance with my invention, and Fig. 2 is a diagrammatic view of a modified system.

Referring to Fig. 1 of the drawing, a fluid compressor 1, which is operated by a motor 2, and a fluid compressor 3, which is operated by the momentum of the vehicle, are connected to a pressure system 4 having a storage reservoir 5 connected thereto. The circuit of the motor 2 which operates the compressor 1 is preferably closed by a fluid switch 6 when the fluid pressure in the pressure system 4 is reduced below 130 pounds pressure and is adapted to be deenergized by the fluid switch 6 when the fluid pressure in the system is raised above 145 pounds pressure. The fluid compressor 3 is preferably connected to an axle 7 of the vehicle by means of a fluid-operated valve 8 and a fluid device 9 when the pressure of the system 4 is reduced below 110 pounds and is disconnected from the axle 7 when the braking pressure is raised above 150 pounds pressure. However, it is to be understood that, if so desired, the switch 6 and the valve 8 may be set for operation between any desired fluid pressures.

The fluid-operated switch 6, which controls the operation of the motor 2, embodies a contact member 10 which is adapted to engage contact terminals 11, and is joined by a rod 12 to a piston 13. The piston 13 is operated in one direction by means of a spring 14, in order to bridge the contact terminals 11 by the contact member 10, and is operated in the opposite direction by means of fluid pressure which is supplied from the pressure system 4, in order to disengage the contact member 10 from the contact terminals 11. An arm 15 extends from the rod 12 for a purpose to be described later.

The fluid compressor 3 is connected to the axle 7 of the vehicle by means of a clutch 16 and a train of gear wheels 17. The clutch 16 embodies a driven member 18, which is mounted rigidly on the shaft 19 of the fluid compressor 3, and a driving member 20 which is shiftably mounted upon a shaft 21 which is connected to the train of gear wheels 17. A lever 22, which is pivotally supported intermediate the ends thereof, is pivotally joined near one end thereof to the driving member 20 of the clutch 16 and is pivotally joined near the opposite end thereof to a piston 23 of the pneumatic device 9. The piston 23, which is joined to the lever 22, is moved in one direction by a spring 24 for operating the clutch 16 and is moved in an opposite direction by fluid pressure which is supplied from the system 4 to disengage the driving and the driven members of the clutch 16.

The fluid-operated valve 8 embodies a plunger 25 operating within a cylinder 26 that is adapted to connect the fluid device 9 to the pressure system 4 when in a raised position and to connect the fluid device 9 to a port 27 in order to release the fluid pressure in the device 9 when in a lowered position. The plunger 25 is connected by means of a rod 30 to a piston 28, which operates within a cylinder 29. The piston 28 is operated in one direction by means of a spring 31 and is operated in an opposite direction by means of fluid pressure supplied from the system 4. The rod 30 is provided with a pin 32 which engages a bifurcated arm 33 of a lever 34 for a purpose to be described later.

A fluid-operated switch 35 is provided in circuit with the motor 2 for preventing the simultaneous operation of the fluid compressors 1 and 3 and embodies a contact member 36 which is adapted to engage the contact terminals 37. The contact member 36 is joined to a piston which is moved in one direction by means of a spring 38 and is moved in an opposite direction by means of fluid pressure which is supplied by the fluid compressor 3. A check valve 39 is provided in the connection between the fluid-operated switch 35 and the fluid compressor 3 and the pressure system 4 in order to prevent the opening of the fluid-operated switch 35 by means of fluid pressure supplied by the system 4.

A device 139, which is associated with a puppet valve 40, the fluid-operated switch 6 and the fluid-operated valve 8, is provided for operating the fluid compressor 3 and the fluid compressor 1 in a predetermined sequence. It is essential to operate the compressors in a predetermined sequence in order to insure that the emergency compressor is available for operation in case of an emergency. The device 139 embodies a ratchet wheel 41 and a cam disk 42 which are mounted upon a shaft 43. The ratchet wheel 41 is operated by a pawl 44 which is associated with the arm 15, which projects from the rod 12 of the fluid-operated switch 6, and a pawl 45 which is operated by the lever 34, which is associated with the fluid-operated valve 8. The cam disk 42, acting on a rod 46 against the action of a spring 47, is adapted to close the puppet valve 40, once for each revolution of the ratchet wheel 41 and the cam disk 42. A switch 48, which is mounted on the rod 46, is provided for breaking the circuit of the motor 2 whenever the puppet valve 40 is closed by means of the cam disk 42.

In case the puppet valve 40 is in an open position, the fluid compressor 3 is stationary, and the fluid pressure of the compressor system 4 falls below 130 pounds, then the fluid switch 6 is operated to complete a circuit through the motor 2, which includes the switch 48 that is controlled by the cam disk 42 and the fluid-operated switch 35 which is controlled by the fluid compressor 3. Thus, the fluid-compressor 1 is operated by the motor 2 until the pressure in the system 4 is raised above 145 pounds at which point the fluid-operated switch 6 is opened by the fluid pressure from the system 4 in order to deënergize the motor 2.

In case the motor 2 be unavailable for service by reason of the failure of the supply circuit or of the motor 2 and the fluid pressure of the system falls below 110 pounds, then the fluid-operated valve 8 is operated by the spring 31 to release the fluid pressure within the fluid-operated device 9 and permit the spring 24 to operate the clutch 16. Thus, the fluid compressor 3 is directly connected to the axle 7 of the vehicle, and, if the vehicle is in motion, the compressor 3 will be operated to maintain fluid pressure in the system 4. It will be noted that, when the fluid compressor 3 is in operation, the fluid pressure from the compressor operating on the piston 35 will disconnect the contact member 36 from contact terminals 37 to break the circuit of the motor 2 and prevent the operation of the fluid compressor 1.

It will be noted that the ratchet wheel 41 is advanced one step by the pawl 44 whenever the fluid compressor 1 is operated by the switch 6 and that the puppet valve 40 is operated by the disk 42 to disconnect the fluid-operated switch 6 from the pressure system 4, each time the disk 42 and the ratchet wheel 41 make a complete revolution. Moreover, the switch 48 which is associated with the rod 46, is adapted to break the circuit of the motor 2 whenever the puppet valve 40 is closed. Thus, whenever the fluid compressor 1 has been operated a predetermined number of times by means of the fluid-operated switch 6, the switch 48 is open and the puppet valve 40 is closed to prevent further operation of the motor 2 and the fluid compressor 1 until the cam disk 42 has been advanced one step to permit the release of puppet valve 40 and the closure of the switch 48. Inasmuch as the motor-operated compressor is not available for service, the fluid pressure within the system 4 will be reduced to a point whereby the momentum-driven compressor 3 is connected to the axle 7 by means of the fluid-operated valve 8 and the fluid device 9. When the fluid-operated valve 8 is operated, it will be noted that the ratchet wheel 41 and the cam disk 42 are advanced one step by means of the pawl 45 to permit the closure of the switch 48 and the opening of the puppet valve 40. However, it is impossible to operate the fluid compressor 1 by the motor 2 at this time by reason of the opening of the fluid-operated switch 35 by means of the fluid pressure supplied by the fluid compressor 3.

From the above description, it will be apparent that the fluid compressors 1 and 3 are selectively operated by the fluid-operated switch 6 and the fluid-operated valve 8 in accordance with the fluid pressure of the system 4 and that the fluid compressors are operated in a predetermined sequence by means of the device 39 embodying the ratchet wheel 41 and the cam disk 42. Moreover, the simultaneous operation of the two compressors 1 and 3 is prevented by means of the fluid-operated switch 35, the cam-operated switch 48 and the puppet valve 40.

Referring to Fig. 2 of the drawing, a system is disclosed wherein a single compressor 60 is operated by the momentum of the vehicle and by the motor 2. The system for operating the motor 2 and for operating the device 9 which connects the compressor to the shaft 7 are similar to that disclosed in the system of Fig. 1 and further description thereof is deemed unnecessary. It will be noted, however, that the fluid-operated switch 35 which is controlled by the fluid compressor 3 in Fig. 1 of the drawing is unnecessary and is not shown in the system disclosed in Fig. 2.

Modifications in the system and arrangement and location of parts may be made within the spirit and scope of my invention and such modifications are intended to be covered by the appended claims.

I claim as my invention:

1. The combination with a pair of compressors, of means directly responsive under all conditions to the delivered pressure of only one of said compressors for operating said compressors according to a predetermined sequence.

2. The combination with a pair of compressors, of means for preventing the simultaneous operation of said compressors.

3. The combination with an electrically-driven compressor and an emergency compressor associated therewith, of means for insuring the operation of said compressors in a given sequence under normal operating conditions.

4. In a compressor system for a vehicle, the combination with a motor-driven compressor, and a compressor driven by the momentum of the vehicle, of means governed by fluid pressure in the compressor system for operating said compressors in a predetermined sequence.

5. In a compressor system for a vehicle, the combination with a motor-driven compressor, and a compressor driven by the momentum of the vehicle, of means for selectively operating said compressors in accordance with the fluid pressure in the compressor system, and means for preventing the simultaneous operation of the compressors.

6. In a compressor system for a vehicle, the combination with a motor-driven fluid compressor, and a compressor driven by the momentum of the vehicle, of means for selectively operating said compressors in accordance with the fluid pressure in the compressor system, and means for automatically operating the fluid compressors in a given sequence under normal operating conditions.

7. In a compressor system for a vehicle, the combination with a motor-driven fluid compressor, and a second compressor driven by the momentum of the vehicle, of means for controlling the operation of the motor-driven compressor, and automatic means controlled by the first-mentioned means for operating the compressors in a predetermined sequence.

8. In a compressor system, the combination with a main compressor and an emergency compressor associated with the main compressor, of means for selectively operating said compressors in accordance with the fluid pressure in the compressor system, and means for preventing the simultaneous operation of the compressors.

9. In a compressor system, the combination with two fluid compressors and means for selectively operating said compressors in accordance with the fluid pressure in the compressor system, of means for insuring the operation of said compressors in a predetermined sequence under normal operating conditions of the system.

10. In a compressor system for a vehicle, the combination with an electrically-driven fluid compressor, a compressor operated by the momentum of the vehicle, and means for operating said compressors in accordance with the fluid pressure in the compressor system, of means for insuring the operation of the two compressors in a predetermined sequence under normal operating conditions.

11. In a compressor system, two fluid compressors, means for selectively operating said compressors in accordance with the fluid pressure in the compressor system, and means for operating said compressor in a given sequence under normal operating conditions.

12. In a compressor system for a vehicle, the combination with a motor-driven compressor, and a compressor driven by the momentum of the vehicle, of means for selectively operating said compressors in accordance with the fluid pressure in the compressor system, means for preventing the simultaneous operation of the two compressors, and means for insuring the operation of the compressors in a given sequence under normal operating conditions.

13. In a vehicle, the combination with an electrically-operated compressor and a compressor operated by the momentum of the vehicle, of means for insuring the operation of said compressors in a given sequence under normal operating conditions.

14. In a compressor system, the combination with a main fluid compressor, an emergency compressor associated with the main compressor, and means for selectively operating said compressors in accordance with the fluid pressure in the braking system, of means for insuring the operation of said compressors in a given sequence under normal operating conditions.

15. The combination with fluid compressor means, and mechanical and electrical means for effecting the operation of said first named means, of means for preventing the simultaneous utilization of said electrical and said mechanical means.

16. In a compressor system, the combination with electrical means for maintaining the fluid pressure in the compressor system, and momentum-operated means for maintaining the fluid pressure in the system, of means for selectively operating said electrical and momentum-operated means in accordance with the fluid pressure in the system and means for preventing the simultaneous operation of said electrical and momentum-operated means.

17. The combination with a pair of compressors and a pair of means for respectively operating said compressors, of a switch controlled by one of said compressors for preventing the simultaneous operation of said compressor.

18. The combination with a compressor and a motive device therefor, of a pair of means for controlling the operation of said device and means for operating one of said pair of means after a predetermined number of operations of the other of said pair of means.

19. The combination with a pair of compressors, of means for rendering one of said compressors inoperative, means for maintaining said compressor inoperative, means for releasing said maintaining means upon the operation of the other of said compressors and means for preventing the operation of said first-named compressor during the operation of said other compressor.

In testimony whereof, I have hereunto subscribed my name this 21st day of Sept., 1917.

KARL A. SIMMON.